(12) United States Patent
Von Matern

(10) Patent No.: US 11,709,269 B2
(45) Date of Patent: Jul. 25, 2023

(54) METHOD, PROCESSING UNIT AND SURVEYING INSTRUMENT FOR IMPROVED TRACKING OF A TARGET

(71) Applicant: Trimble AB, Danderyd (SE)

(72) Inventor: Johan Von Matern, Danderyd (SE)

(73) Assignee: Trimble AB, Danderyd (SE)

( * ) Notice: Subject to any disclaimer, the term of this patent is extended or adjusted under 35 U.S.C. 154(b) by 875 days.

(21) Appl. No.: 16/694,547

(22) Filed: Nov. 25, 2019

(65) Prior Publication Data

US 2020/0088879 A1    Mar. 19, 2020

Related U.S. Application Data

(63) Continuation of application No. PCT/EP2017/065296, filed on Jun. 21, 2017.

(51) Int. Cl.
*G01S 17/66* (2006.01)
*G01S 17/08* (2006.01)
(Continued)

(52) U.S. Cl.
CPC .............. *G01S 17/66* (2013.01); *G01S 17/08* (2013.01); *G01S 17/50* (2013.01); *G01S 7/484* (2013.01); *G01S 7/486* (2013.01)

(58) Field of Classification Search
CPC .......... G01S 17/66; G01S 17/08; G01S 17/50; G01S 7/484; G01S 7/486; G01C 15/002
See application file for complete search history.

(56) References Cited

U.S. PATENT DOCUMENTS 6,266,628 B1    7/2001 Huep et al.
2012/0008136 A1    1/2012 Jaeger et al.
(Continued)

FOREIGN PATENT DOCUMENTS

CN    103782132 A    5/2014
CN    105823460 A    8/2016
(Continued)

OTHER PUBLICATIONS

International Preliminary Report on Patentability for Application No. PCT/EP2017/065296, dated Dec. 24, 2019, 14 pages.
(Continued)

*Primary Examiner* — Isam A Alsomiri
*Assistant Examiner* — Sanjida Naser
(74) *Attorney, Agent, or Firm* — Kilpatrick Townsend & Stockton LLP

(57) ABSTRACT

A method implemented in a processing unit controlling a surveying instrument is provided. The method comprises obtaining a first set of data from optical tracking of a target with the surveying instrument, and identifying from the first set of data a dependence over time of at least one parameter representative of movements of the target. The method further comprises receiving a second set of data from a sensor unit via a communication channel, the second set of data including information about the at least one parameter over time, and determining whether a movement pattern for the optically tracked target as defined by the dependence over time of the at least one parameter is the same as, or deviates by a predetermined interval from, a movement pattern as defined by the dependence over time of the at least one parameter obtained from the second set of data.

19 Claims, 8 Drawing Sheets

(51) Int. Cl.
    *G01S 17/50*    (2006.01)
    *G01S 7/484*    (2006.01)
    *G01S 7/486*    (2020.01)

(56) References Cited

U.S. PATENT DOCUMENTS

| | | | |
|---|---|---|---|
| 2012/0124850 A1 | 5/2012 | Ortleb et al. | |
| 2014/0350886 A1* | 11/2014 | Metzler | G01S 7/003 |
| | | | 702/150 |
| 2016/0131745 A1* | 5/2016 | Nordenfelt | G02B 27/144 |
| | | | 356/4.01 |
| 2017/0219345 A1* | 8/2017 | Török | G01C 1/04 |

FOREIGN PATENT DOCUMENTS

| | | |
|---|---|---|
| WO | 2012/088413 A1 | 6/2012 |
| WO | 2013/037848 A1 | 3/2013 |

OTHER PUBLICATIONS

International Search Report and Written Opinion for Application No. PCT/EP2017/065296, dated Apr. 20, 2018, 23 pages.

* cited by examiner

METHOD, PROCESSING UNIT AND SURVEYING INSTRUMENT FOR IMPROVED TRACKING OF A TARGET

CROSS-REFERENCE TO RELATED APPLICATIONS

The present application is a continuation of International Application No. PCT/EP2017/065296, filed Jun. 21, 2017, the contents of which are incorporated herein by reference in their entirety for all purposes.

TECHNICAL FIELD

The present disclosure generally relates to the field of surveying. In particular, the present disclosure relates to surveying instruments configured to track a target and to measure a direction and/or distance to the target.

BACKGROUND

In the field of surveying there are surveying instruments capable of tracking a moving target. However, targets may be lost during tracking, and due to the surveying instruments' narrow line of sight, finding them again may be very difficult. This often means manual intervention and re-targeting, which may be time consuming.

Another problem in the present field is to ensure that the target being tracked is the correct one. In a surveying environment with potentially a multitude of possible targets and other objects to track, it may be hard to verify that the target being tracked is the correct target to track, and not another target that happened to be caught in the line of sight of the surveying instrument.

Therefore, a challenge in the present technical field is to provide a surveying instrument with improved tracking of a moving target.

SUMMARY

An object of the present disclosure is therefore to mitigate some of the drawbacks described above. To achieve this, a method implemented in a processing unit controlling a surveying instrument, a processing unit and a surveying instrument as defined in the independent claims are provided. Further embodiments are defined in the dependent claims.

According to an aspect, a method implemented in a processing unit controlling a surveying instrument is provided. The method comprises obtaining a first set of data from optical tracking of a target with the surveying instrument, and identifying from the first set of data a dependence over time of at least one parameter representative of movements of the target. The method further comprises receiving a second set of data from a sensor unit via a communication channel, the second set of data including information about the at least one parameter over time, and determining whether a movement pattern for the optically tracked target as defined by the dependence over time of the at least one parameter is the same as, or deviates by a predetermined interval from, a movement pattern as defined by the dependence over time of the at least one parameter obtained from the second set of data.

With this method, the processing unit controlling the surveying instrument may receive, and use, more information than before, and may thereby improve the optical tracking of a target. The movement pattern(s) determined from the two datasets may be used to ensure that the optical tracking is correctly performed and may be used for ensuring the identity of the target so that the correct target is optically tracked.

It has been realized that using data from a sensor unit in combination with the data collected by the surveying instrument via optical tracking may be used to improve the target tracking in general. By, for example, obtaining the data collected by the surveying instrument and the data from the sensor unit over time and comparing them, conclusions about the target's identity, its rotation, or other conclusions that may improve the tracking by the surveying instrument may be drawn. Using another independent set of measurement data, such as the second set of data from the sensor unit, may help in verifying the accuracy of the optically tracked data. The use of the two different sets of measurement data may be used to make the surveying and tracking of targets more automated. Further implementations will be exemplified in the following embodiments.

The target may be any type of target suitable for optical tracking. For example, a target comprising a prism to reflect light transmitted from the surveying instrument may be used, but also other types of targets may be used.

The surveying instrument may be a geodetic surveying instrument, or another surveying instrument suitable for optical tracking of a target, i.e. capable of tracking the target as it moves.

It will be appreciated that "determining whether a movement pattern for the optically tracked target as defined by the dependence over time of said at least one parameter is the same as, or deviates by a predetermined interval from, a movement pattern as defined by the dependence over time of said at least one parameter obtained from the second set of data" may be referred to as that the movement patterns match, that the movement patterns are similar or that the targets have the same, or nearly the same, movement pattern.

It will be appreciated that because of e.g. measurement tolerances and/or other reasons, the two movement patterns, as determined from the first and second set of data, respectively, may not be exactly identical although they originate from the same target (i.e. the target being optically tracked is the target to which the sensor unit is attached). For this reason, it may be sufficient to determine that the two movement patterns only differ by a predetermined interval.

In the present specification, the term "movement pattern" may include the movements over time of any object, approximated into a pattern that is comparable to other "movement patterns". As mentioned above, a movement pattern may be defined as the dependence over time of a parameter representative of the movement(s) of the target.

Further, the term "processing unit" may refer to the "processing unit controlling a surveying instrument". The processing unit may be separate from the surveying instrument, or it may be part of the surveying instrument. The processing unit may also be referred to as a processor or a processing means.

By the term "movements", any type of movement is referred to, which may include, but is not limited to, changes in tilt, changes in compass direction or rotation, changes in position, or the like.

The communication channel may be any type of channel or link used for communications, for example a wireless channel or link, such as a radio link, or another connection suitable for communication between devices.

According to an embodiment, the determining may include comparing the dependence over time of the at least one parameter obtained from the second set of data with a representation (or dependence) over time of the at least one parameter obtained from the first set of data. The comparison may be performed on a point-by-point basis, regression analysis, interpolation or by approximating a path in a coordinate system. For example, a Kalman filter may be used. Comparing the two datasets over time may give an accurate picture of the movement patterns of the target as represented by the data.

Different amounts of data may be used for the comparison. For example, the processing unit may use data from a predetermined number of seconds in time, or it may use a predetermined number of data points. As there might be some difference in time between the two data sets, the comparison may comprise adjusting for differences in time between the first and the second data set. Further, there might be a rotation of the target in relation to the surveying device which the processing unit may adjust for before determining if the movement patterns match.

In an embodiment, the method may further comprise determining that the second set of data originates from a sensor unit attached at the target (being optically tracked) if the movement pattern for the optically tracked target is the same as, or deviates by a predetermined amplitude (or interval) from, the movement pattern obtained from the second set of data, and continuing optical tracking of the target. Such an amplitude (or interval) may, for example, be at least 120% or 130% of the combined accuracy of the sensor unit and of the surveying instrument. The combined accuracy is the maximum expected measurement error by the sensor unit and the surveying instrument. For example, if the combined accuracy of the sensor unit and of the surveying instrument is +−1%, an amplitude or interval may be a difference within 1.2%. Having the predetermined amplitude or interval larger than the expected error in measurements allows for a more accurate determination that the movement patterns are the same.

The processing unit may use the received data to verify that the target being optically tracked is the correct one and to continue tracking the target when it is determined to be the correct one. This may be advantageous, for example, when there are multiple potential targets in the area, or when the target is within an area where there are obstructions for the optical tracking. Instead of, for example, verifying the target's identity manually every time the tracking is resumed, the processing unit may verify it automatically with the data received.

According to an embodiment, the method may comprise determining that the second set of data does not originate from a sensor unit attached at the target being optically tracked if the movement pattern for the target is outside of a predetermined amplitude or interval of the movement pattern obtained from the second set of data. The method may further comprise stopping optical tracking of the target. The processing unit may wait a predetermined amount of time, a predetermined number of measurements, or until there is enough data to determine within a predetermined confidence interval that the second set of data does not originate from a sensor unit attached at the target being optically tracked, before stopping optical tracking of the target. The processing unit may determine that the target being optically tracked is not the correct target, and in response stop tracking the target. Stopping tracking of an incorrect target may lead to less faulty tracked data. The determination further gives the possibility to early realize that the surveying instrument is tracking an incorrect target, and to correct that before time and/or resources may have been wasted.

The method may further comprise initiating a search for the target to which the sensor unit is attached. The initiation may comprise optically searching for a new target, and once a new target is found, using the method as described above to verify if the target is the correct one. If not, the surveying instrument may initiate another search for the target. The search may be initiated automatically when the tracking has been stopped after it has been determined that the target was not the correct one. The search may originate from the last known position of the correct target, if one is known.

It will be appreciated that a target may comprise a geodetic pole (or rod) and an optical element arranged on the geodetic pole. The geodetic pole may be telescopic and a distance between the sensor unit and the optical element of the target along the geodetic pole may be input to the processing unit as a configuration step. In the following, the distance input to the processing unit may be referred to as a configured distance. In some embodiments, the sensor unit may be arranged at a fixed part of the geodetic pole while the optical element may be arranged at a telescopic (or extendable) part of the geodetic pole. The distance between the sensor unit and the optical element may therefore vary from time to time or between different measurements. An operator or user may enter via a user interface the distance between the sensor unit and the optical element.

In the case of a passive target, the optical element may for example be a prism or a mirror or, more generally, an optically reflecting element to be used for the purpose of optical tracking. In the case of an active target, the optical element may be a light source which then may also be used for the purpose of optical tracking.

If the sensor unit and the optical element are not positioned at the same position along the geodetic pole, a movement pattern obtained from the first set of data (i.e. obtained by optical tracking via the optical element) may not be identical to a movement pattern obtained from the second set of data (i.e. obtained by the data sent from the sensor unit). However, the movement pattern obtained by the first set of data (i.e. by optical tracking) may be corrected based on the distance, as configured, between the sensor unit and the optical element. If the distance is correctly configured, the corrected movement pattern obtained from the first set of data will be equivalent, or at least resemble, the movement pattern obtained from the second set of data and the processing unit may be configured to determine that the sensor unit (from which the second set of data is received) is arranged at the optically tracked target. The surveying instrument may then continue the optical tracking of the target. In the above examples, it will be appreciated that, instead of the movement pattern obtained from the first set of data, the movement pattern obtained from the second set of data may be corrected.

According to an embodiment, the target may include a geodetic pole and an optical element for optical tracking, and the method may comprise a step of determining whether, at least based on a configured distance between the optical element and the sensor unit along the geodetic pole, a movement pattern obtained by the first set of data (for the optically tracked target) matches a movement pattern obtained by the second set of data. As a result, the processing unit may cause the surveying instrument to continue optical tracking of the target.

In the present embodiments, the distance between the optical element and the sensor unit arranged on the target may be accounted for, thereby decreasing the risk for false determinations that the tracking should be stopped.

According to an embodiment, the method may further comprise, if it has been determined that the movement patterns obtained by the first and second sets of data do not match based on the configured distance between the sensor unit and the optical element along the geodetic pole of the target, determining whether the movement pattern for the optically tracked data matches the movement pattern obtained from the second set of data using another distance between the sensor unit and the optical element of the target along the geodetic pole. The method may then further comprise a step of sending an alert indicating that the distance between the sensor unit and the optical element has not been correctly configured.

As mentioned above, the surveying instrument may continue optical tracking of the target. However, if on receipt of the alert, it is determined that the distance has in fact been correctly configured, the processing unit (or an action of the operator) may cause the optical tracking to be stopped.

In the above embodiments, it will be appreciated that an operator or user may have configured a distance a as the expected distance between the sensor unit and the optical element of the target. If is not determined that the movement pattern for the optically tracked target is the same as, or deviates by a predetermined amplitude (or interval) from, the movement pattern obtained from the second set of data, based on the distance a, there may be a distance d for which it may be determined that the movement patterns match. If there is such a distance d, an alert may be sent to indicate that the distance may be incorrectly configured.

By sending an alert that the target is incorrectly configured, measure errors may be avoided or at least reduced. In this embodiment, a change in distance between the sensor unit and the optical element of the target used for optical tracking may be detected. This may be the result of a change of the telescopic arrangement of the geodetic pole such that the distance between the prism or other optical component used for optical tracking and the sensor unit has changed.

Once the correct target is found and identified, the surveying instrument may start optical tracking of the target. This may be beneficial since the need for manual intervention is reduced, or even eliminated. Indeed, the surveying instrument may by itself determine that the target being optically tracked is not the correct one, and in response to that information, initiate a search for the correct target and when found, optically track the target. This may increase the automation of surveying and tracking targets, and it may further reduce both the errors and/or the manual work needed, since the processing unit may initiate the search for the correct target automatically.

According to an embodiment, the method may comprise determining an orientation of the target in relation to the surveying instrument if the movement pattern for the optically tracked target is the same as, or deviates by a predetermined amplitude or interval from, the movement pattern obtained from the second set of data. A target may be rotated in comparison to the surveying instrument, meaning, for example, that the front of the target is not facing the same direction as the front of the surveying instrument. The rotation may affect the optical tracking and the direction of the sensor unit data. For example, the target's rotation may affect the amount of light that is reflected, or the direction of the reflected light. Further, determining the orientation of the target together with knowledge of the at least one parameter may improve prediction of a future position of the target. The processing unit determining the rotation of the target in comparison to the surveying instrument (i.e. determining the orientation of the target) may therefore improve optical tracking of the target. Further, using the rotation when determining a movement pattern and when comparing the data sets may lead to less computing needed. The determined rotation may also be used to rotate the target in a more advantageous way by an operator, if any.

The rotation estimation may be used by the processing unit to reset velocity- and position drift.

The method may further comprise determining in a coordinate system of the surveying instrument a first path of the optically tracked target based on the first set of data, determining in the coordinate system a second path based on the second set of data, comparing the two paths to determine an angle between the first path and the second path, and determining the rotation of the target in relation to the surveying instrument based on the comparison (and in particular based on the angle).

The comparison may also be performed by determining the first path based on the first set of data in a first coordinate system, determining the second path based on the second set of data in a second coordinate system, and determining, if the movement pattern of the first and second data sets are the same or nearly the same, the rotation between the two coordinate systems. Based on the rotation between the first and second coordinate systems an estimation of the rotation of the target in relation to the surveying instrument may be obtained.

According to an embodiment, the second set of data includes at least one of data from an accelerometer, data from a gyroscope, compass data, data from a barometric altimeter, or data from an image based motion sensor. The processing unit may use such information for improving tracking as having this information provides data representative of the target's movements.

According to the present embodiment, the sensor unit attached at the target may for example be an image based motion sensor, i.e. the data are obtained by image based motion sensing, such that the second set of data includes data from such an image based motion sensor. The image based motion sensor may be a video camera for video navigation (or for navigation purposes) and the image based motion sensor (or video camera) is oriented towards the ground (i.e. the field of view of the video camera is directed towards the ground) such that it provides real time measurements of movements.

The image based motion sensor may detect movements in six dimensions in the sense that it may detect three positions (along three coordinate axis of a Cartesian coordinate system) and three rotations (around the three coordinate axis of the Cartesian coordinate system).

According to an embodiment, the at least one parameter representative of movements over time of the target includes acceleration, velocity, position, orientation, pressure or temperature. Determining the movements over time may facilitate the comparison of the two datasets. Different types of data may be received from the sensor unit, as described above. Further, different parameters may be suitable depending on what data is received from the sensor unit to reduce the amount of processing needed.

According to an embodiment, the receiving of the second set of data may comprise establishing a communication channel between the processing unit and the surveying unit. For establishing a communication channel, the sensor unit sending the data and/or the target to which the data corresponds may be identified, and the data may thus be sent with low risk of being confused with other targets' data. When a communication channel is established, the processing unit and the sensor unit may communicate and the sensor unit may send the data indicating movements of the target. Further, with this step, the surveying instrument establishes a communication channel with the target which it is supposed to optically track.

The establishing of the communication channel may include using a pre-determined frequency. The sensor unit and the processing unit may be configured to communicate using a predetermined frequency to facilitate communication and recognition of the second set of data by the processing unit. In some implementations, the sensor unit associated with a specific target and the processing unit may communicate via a dedicated frequency, i.e. a frequency unique for this specific target, such that other targets (or rather other sensor units associated with those targets) communicate using other (different) dedicated frequencies.

In an embodiment, the second set of data may comprise an identifier for establishing communication via the communication channel between the surveying instrument and the target. This identifier may be used to ensure that the second set of data originates from a sensor unit attached to, or associated with, the correct target to be tracked.

In an embodiment, the at least one parameter may include positions of the target over time in a coordinate system. The coordinate system may be any type of coordinate system and representation thereof. The data may be cleaned before using it for analysis, for example by approximating, interpolating or determining a movement pattern as indicated by a data set. A movement pattern may be determined for the first set of data, and another movement pattern may be determined for the second set of data.

According to an embodiment, the processing unit may be part of the surveying instrument. In other words, the processing unit may be integrated in the surveying instrument. The sensor unit associated with the target can then be configured to communicate with the surveying instrument.

It will also be appreciated that the sensor unit may have one sensitive part attached to the target for detecting the value of the parameter representative of the target's movements. However, the part communicating with the processing unit may be located elsewhere as long as it has obtained the value of the parameter, as measured by the sensitive part.

In an embodiment, the optical tracking may comprise transmitting a transmit light signal toward the target at an emission time, receiving, at a receive time, a return light signal from reflection of the transmit light signal against the target, and determining a direction and/or a position of the target based on at least the emission time and the receive time.

According to one aspect, a processing unit is provided. The processing unit is configured to operate in accordance with a method as defined in any of the previous embodiments.

According to one aspect, a surveying instrument is provided. The surveying instrument may comprise a processing unit, as defined in any one of the embodiments described above.

In one embodiment, the surveying instrument may comprise a transceiver configured to communicate with a sensor unit.

In one embodiment, the surveying instrument may comprise a center unit having an instrument optical axis, the center unit being mounted on an alidade for rotation about a first axis and on a base for rotation about a second axis.

It is noted that embodiments of the invention relate to all possible combinations of features recited in the claims. Further, it will be appreciated that the various embodiments described for the method are all combinable with the processing unit and/or surveying device as defined in accordance with the other aspects of the present invention, and vice versa.

BRIEF DESCRIPTION OF THE DRAWINGS

Exemplifying embodiments will be described below with reference to the accompanying drawings, in which.

Figure 1A:
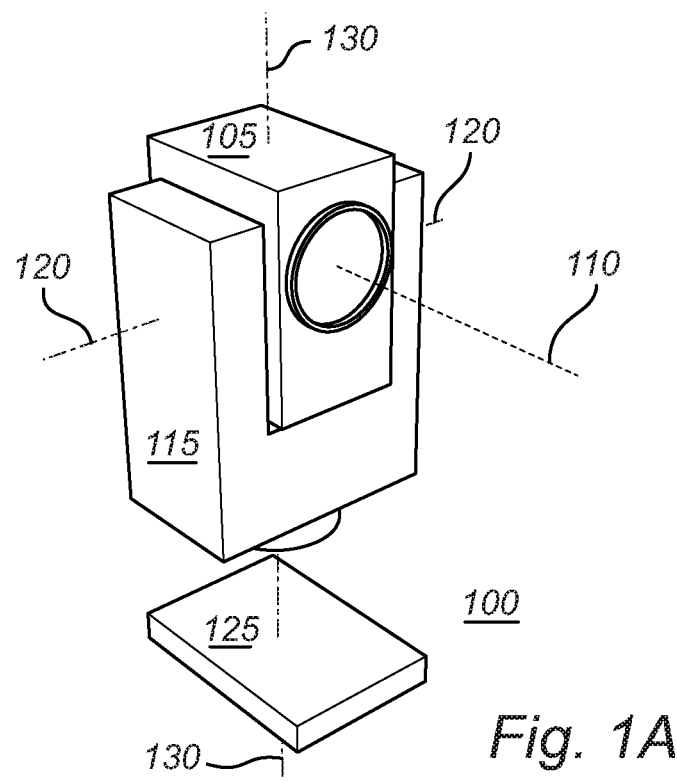
FIG. 1a illustrates a surveying instrument and FIG. 1b illustrates a target with a sensor unit attached to it.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may be exaggerated for illustrative purposes and, thus, are provided to illustrate the general structures of the embodiments.

DETAILED DESCRIPTION OF EMBODIMENTS

Exemplifying embodiments will now be described more fully hereinafter with reference to the accompanying drawings. The drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

FIG. 1A schematically illustrates a surveying instrument 100 in accordance with some embodiments. The surveying instrument 100 may include a center unit 105, such as a telescope assembly, having an instrument optical axis 110. The telescope assembly or center unit 105 is mounted for rotation about two axes: on a trunnion of an alidade 115 for rotation about a first (trunnion) axis 120, and on a base 125 for rotation about a second (azimuthal) axis 130. The surveying instrument 100 may for example be a geodetic instrument, such as a total station, a scanner or a theodolite, and is configured to carry out at least parts of one or more methods as will be described later herein.

The surveying instrument 100 may be configured to measure a distance to a target, measure a direction to the target and/or measure a position of the target. The surveying instrument 100 may be configured to perform tracking of the target. The center unit 105 may be configured to track, determine the distance to, or determine a position of a target by emitting a tracking light signal toward a target and receives a tracking return signal, if any, from the target. The center unit 105 may be configured to maintain the optical axis 110 of the center unit 105 aimed toward the target as the target moves.

Figure 1B:
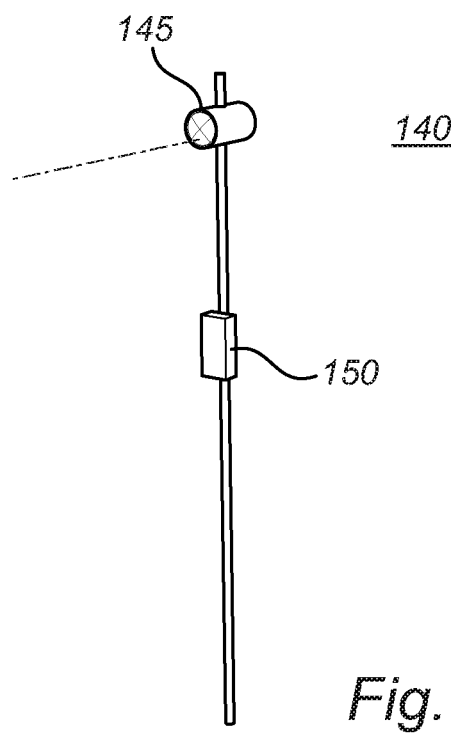

FIG. 1B illustrates a target 140 that may have a sensor unit 150 attached to it. The target 140 may comprise a prism or another optical element such as a mirror 145 configured to reflect light. The target 140 is configured to carry out at least parts of one or more methods as will be described later herein.

The surveying instrument 100 may comprise a transceiver configured to communicate wirelessly with the sensor unit 150.

The target may, in some examples, comprise a telescopic rod or telescopic geodetic pole. The rod or pole may comprise an upper extendable portion and a lower non-extendable, i. e. fixed, portion. The prism or other optical element, such as a mirror, may be arranged on the extendable portion of the rod, while the sensor unit may be arranged on the fixed part of the rod. With targets comprising a telescopic rod, the length of the rod may need to be configured in order to correctly calculate the position of the target.

If the target has a sensor unit, the target 140 may include also a battery (not illustrated) to power the sensor unit 150, although it is envisaged that power may be provided to the sensor unit 150 also from an external source through a wire, solar energy or the like. If, for example, the target 140 is mounted on a vehicle or other structure, power may be provided to the sensor unit 150 from this vehicle or other structure. Alternatively, a battery may be included in the sensor unit 150 itself.

The sensor unit 150 is configured to detect one or more parameters representative of a movement of the target 140. The sensor unit 150 may be configured to collect and transmit data including acceleration, velocity, position, orientation, pressure or temperature of the target 140. The sensor unit 150 may further comprise a transceiver (not shown) to wirelessly communicate with the surveying instrument 100 or a processing unit associated with the surveying instrument. The sensor unit 150 may be attached to the target 140. The sensor unit 150 is configured to carry out at least parts of one or more methods as will be described later herein.

Figure 2:
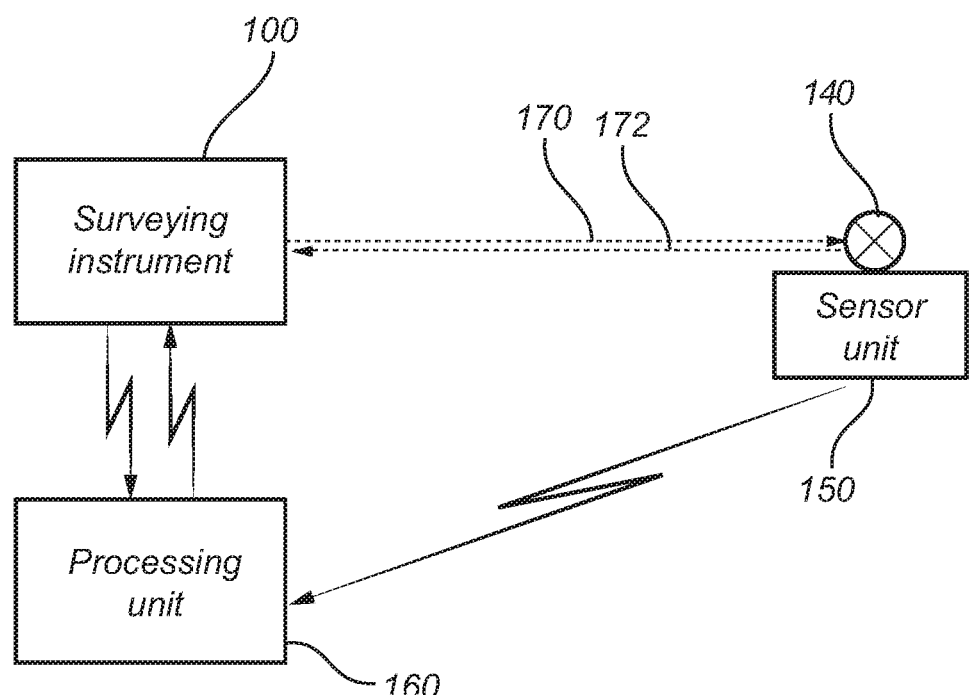
FIG. 2 is a block diagram of a surveying instrument, a processing unit, a target and a sensor unit in a surveying system according to embodiments of the present disclosure.

FIG. 2 is an overview of a surveying system comprising a surveying instrument 100 (such as e.g. the surveying instrument described with reference to FIG. 1A), a sensor unit 150 attached to a target 140 and a processing unit 160. The processing unit 160 may control the surveying instrument 100 or the processing unit 160 may provide information to another processing unit controlling the surveying instrument 100. The processing unit 160 is configured to carry out at least parts of one or more methods as will be described later herein.

The surveying instrument 100 may transmit an optical signal 170 towards the target 140 and the target 140 may reflect the optical signal 170. The reflected signal 172 may be received by the surveying instrument 100, and it may be used for determining a distance to the target 140, a direction to the target 140, and/or a position of the target 140. The distance to the target 140 may for example be determined using a time-of-flight method based on an emission time at which the optical signal 170 is transmitted from the surveying instrument 100 to the target 140 and a receive time at which the reflected signal 172 is received at the surveying instrument 100. In other words, the surveying instrument 100 may optically track the target 140.

The processing unit 160 may receive data from the sensor unit 150 attached to the target 140, and from the surveying instrument 100. The data received from the surveying instrument 100 may be a first set of data obtained by optical tracking of the target 140, as described above. The data received from the sensor unit 150 may be a second set of data indicating a movement of the target 140.

The data received from the sensor unit 150 may relate to a specific parameter over time, indicating a movement of a target, or it may be raw measurement data. The processing unit 160 may process the data and extract the parameter to obtain the dependence over time of the parameter and thereby determine a movement pattern based on the second set of data.

Parameters indicating movements of the target may be, but is not limited to, acceleration, velocity, position, and/or orientation.

In particular, the processing unit may receive data from the sensor unit over a wireless communication channel or link. The processing unit may identify the sensor unit from which the data originates based on, but not limited to, the frequency used to transmit the data was, or an identifier sent together with the data. The frequency may be a predetermined frequency. The identifier may be any type of data that the processing unit may identify the sensor unit, or rather the target to which the sensor unit is attached, with.

The receiving of the second set of data may comprise receiving an identifier for establishing communication via the communication channel between the surveying instrument and the target.

Still referring to the exemplifying surveying system described with reference to FIG. 2, examples of movement patterns and data are described in the following with reference to FIGS. 3A-3C.

Figure 3A:
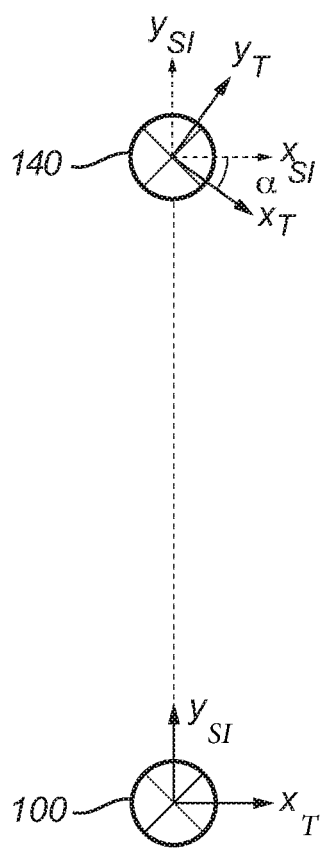
FIGS. 3a-3c provide a schematic view of a rotation of a target in relation to a surveying instrument, and a representation of movements of a target as measured by a sensor unit and by a surveying instrument.

FIG. 3A is an overview of a target 140 and a surveying instrument 100. The surveying instrument may have a forward direction $y_{SI}$ and a side direction $x_{SI}$. The target may have a front direction $y_T$ and a side direction $x_T$. The target may be rotated in relation to the surveying instrument with an angle $\alpha$.

Figure 3B:
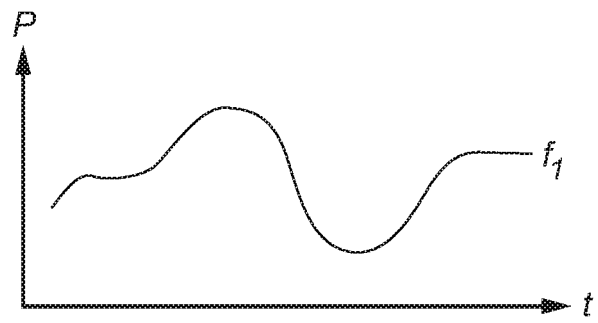
Figure 3C:
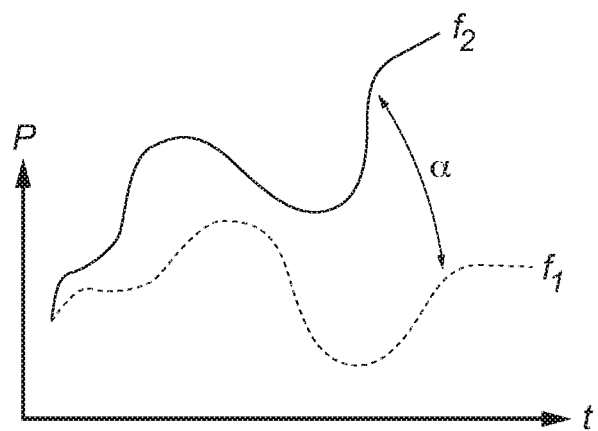

FIGS. 3B and 3C show example data representative of the movements based on data from a sensor unit attached to the target 140 and the movements of the target 140 as determined by a surveying instrument 100, respectively.

The representation $f_1$ in FIG. 3C is an illustration of example data sent from a sensor unit 150 attached to the target 140. The representation $f_2$ in FIG. 3C is an illustration of example data that may be obtained by the surveying instrument 100 via optical tracking. From data obtained by optical tracking a processing unit may determine a dependence over time of a parameter, and thereby determine a movement pattern.

FIG. 3B shows a representation $f_1$ of the target's movements, or movement pattern, over time as represented by a parameter p over time t, as measured by a sensor unit attached to the target 140.

FIG. 3C shows a representation $f_2$ of the target's movements, or movement pattern, over time as represented by a parameter p over time t, as optically measured by the surveying instrument. The data may be obtained during optical tracking, for example, by determining the position of, distance to or direction of a target.

The processing unit 160 may receive the two sets of data, either the raw measurement data itself or a representation f as, for example, shown in FIGS. 3B or 3C. If there is no representation already, the processing unit 160 may analyze the data and extract a representation of the target's movements over time with at least one parameter. The processing unit 160 may do a regression analysis or an interpolation of the data. If the data sets have the same parameter over time the processing unit 160 may compare them without extracting another parameter over time first. The processing unit 160 may extract a parameter only from one of the data sets if that parameter is already represented in the other data set.

The processing unit 160 may further compare the two representations over time and determine if they have the same movement pattern. The processing unit 160 may determine that the two data sets indicate the same movement pattern if they are within a predetermined interval, and the processing unit 160 may, correspondingly, determine that the two data sets do not indicate the same movement pattern if they are outside of the predetermined interval or deviation. Such an interval or deviation may, for example, be 120%, 130% or more of the combined accuracy of the sensors.

The processing unit 160 may compare the movements over time in different ways, one example is by comparing on a point-by-point basis. Another example is by comparing approximated functions or paths.

As an illustrative example only, the processing unit 160 may receive data from the sensor unit 150 indicating the target's acceleration at different points in time. The processing unit may also receive optical tracking data comprising a target's position at different points in time. The processing unit 160 may process the optical tracking data and extract the target's acceleration at different points in time. Finally, the processing unit 160 may compare the two data sets point by point in time and determine if the acceleration in each point in time are within a predetermined interval from each other.

Once the processing unit 160 has determined that the two datasets provide the same, or nearly the same, movement pattern, a rotation of the target 140 in relation to the surveying instrument 100 may be determined. The angle of the rotation of the target 140 in relation to the surveying instrument 100 may correspond to the angle between the two representations of movements over time $f_1$ and $f_2$ in a coordinate system.

In FIGS. 3B-3C the coordinate system is represented by a two-dimensional coordinate system, but also other coordinate systems may be used, for example a three-dimensional coordinate system. The coordinates may be a parameter p and time t. Different coordinate systems are possible, for example Cartesian or polar coordinate systems.

The processing unit 160 may also compensate for differences in time between the data received from the sensor unit 150 and the data from optical tracking of the target 140. The sensor unit 150 may have one timestamp which may differ from the timestamp of the data obtained from the optical tracking.

In response to determining if the movement pattern $f_1$ as determined from the data received from the sensor unit data has the same movement pattern or is within a predetermined interval from a movement pattern $f_2$ as determined by the optically tracked data, the surveying instrument 100 may continue tracking the target 140 having the matching movement pattern.

If it has been determined that the movement pattern of an optically tracked target 140 does not match the movement pattern of the data from a sensor unit 150, the tracking of the target 140 may be stopped. The tracking may be continued for some more time after the determination has been made. The tracking may be continued until there is enough data to determine within a predetermined confidence interval that the movement pattern of the optically tracked target does not match the pattern of the data from the sensor unit 150.

The processing unit 160 may determine that the two datasets have the same movement pattern based on a configured distance, along the rod of the target 140, between a sensor unit 150 attached to the target 140 and the optical element 145. This means in other words that, based on a distance as configured to be the (expected) distance between the sensor unit 150 and the optical element 145 along the geodetic pole, the movement pattern obtained from either one of the first or second sets of data may be corrected and the corrected movement pattern may be compared with the other movement pattern to check whether they match. If it is determined that the movement patterns do not match based on the configured distance, the processing unit 160 may determine a distance for which the movement patterns match.

If the processing unit does not find any distance for which one of the two movement patters may be corrected in order to match, the optical tracking may be stopped.

However, if it is determined that there is a distance for which the two movement patterns can match, then it could be that the distance between the sensor unit and the optical element along the geodetic pole of the target 140 has not been configured correctly. The surveying instrument 100 may then continue tracking the target 140.

If it has been determined that the distance along the rod of the target 140 between the sensor unit 150 and the optical element 145 has not been configured correctly, an alert may be sent (e.g. to the operator/user via a user interface or other means). The processing unit 160 may send the alert.

If the tracking has been stopped, the surveying instrument 100 may initiate a search for a target to optically track, and use any steps or methods as described herein.

It will be appreciated that a processing unit 160 may communicate with several sensor units.

With reference to FIG. 4, a method implemented in a processing unit 160 for searching for a (lost or not yet tracked) target is described.

A surveying instrument 100 may lose track of a target and initiate a search to find it again. Alternatively, the surveying instrument 100 may initiate tracking of a target. However, there might be several potential targets in the environment.

Figure 4A:
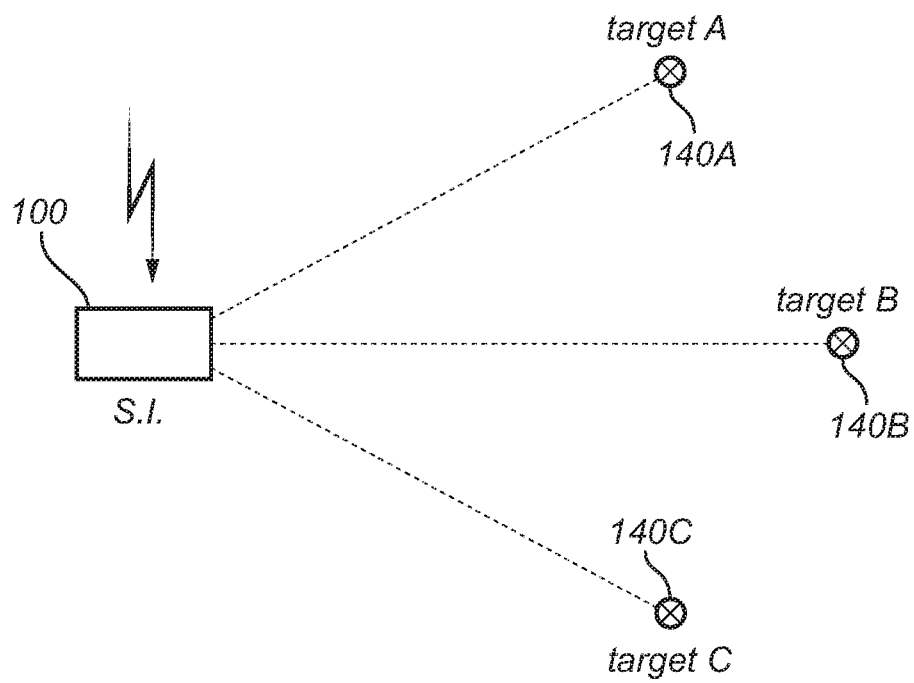
FIGS. 4a-e shows a schematic view of a surveying instrument tracking multiple targets, and a representation of movements of a target from a surveying instrument and multiple sensor units, respectively.
Figure 4B:
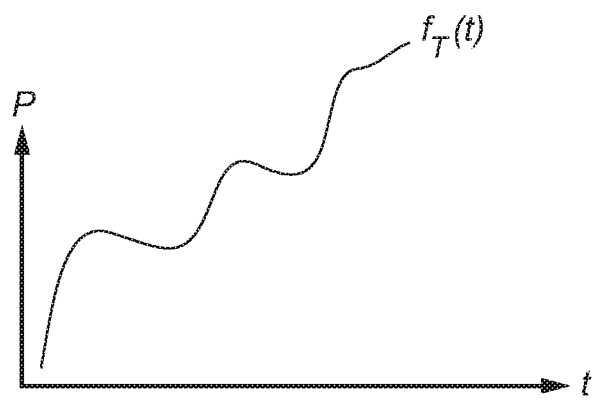
Figure 4C:
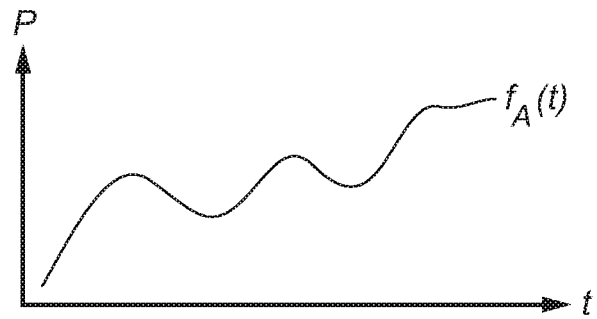
Figure 4D:
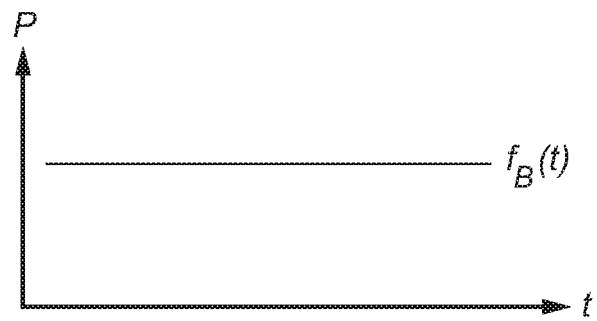
Figure 4E:
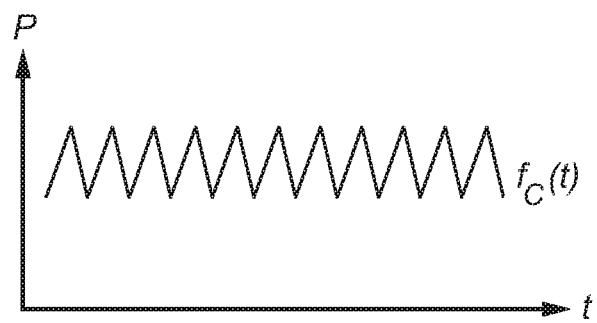

FIG. 4A is an overview of a surveying instrument 100 identifying multiple potential targets 140A, 140B, 140C in an environment via optical tracking. The processing unit 160 may obtain optical tracking data for all of the targets 140A, 140B, 140C. The processing unit 160 may also receive data from a sensor unit 150 attached to the correct target (i.e. the target that the surveying instrument 100 is supposed to track). FIG. 4B shows example data from a sensor unit attached to the correct target. FIGS. 4C, 4D, 4E show example data of the targets 140A, 140B, 140C as obtained by optical tracking. The processing unit 160 may compare the data in FIG. 4B of the sensor unit 150 with the data represented in FIGS. 4C, 4D, 4E of the targets 110A, 110B, 110C 140A, 140B, 140C, respectively, to determine if any of the data has the same, or nearly the same, movement pattern as the data from the sensor unit 150. In the present example, the processing unit 160 may determine that the movement pattern of the data represented by the data in FIG. 4C has the same, or nearly the same, movement pattern, or is within a predetermined interval, of the movement pattern of the data in FIG. 4B obtained from the sensor unit 150. As indicated by FIGS. 4B and 4C, the processing unit 160 may have to adjust for time as well as rotation to improve the comparison of the data.

When it has been determined that the movement pattern of the data shown in FIG. 4C matches the movement pattern in FIG. 4B, it may be further determined the sensor unit communicating the data of FIG. 4B is attached to target 140A.

It may be determined that the data shown in FIG. 4B does not originate from a sensor unit 150 attached to any of the targets 140B or 140C since the movement patterns shown in FIG. 4D and FIG. 4E do not match or are within a predetermined interval of the movement pattern shown in FIG. 4B.

Figure 5:
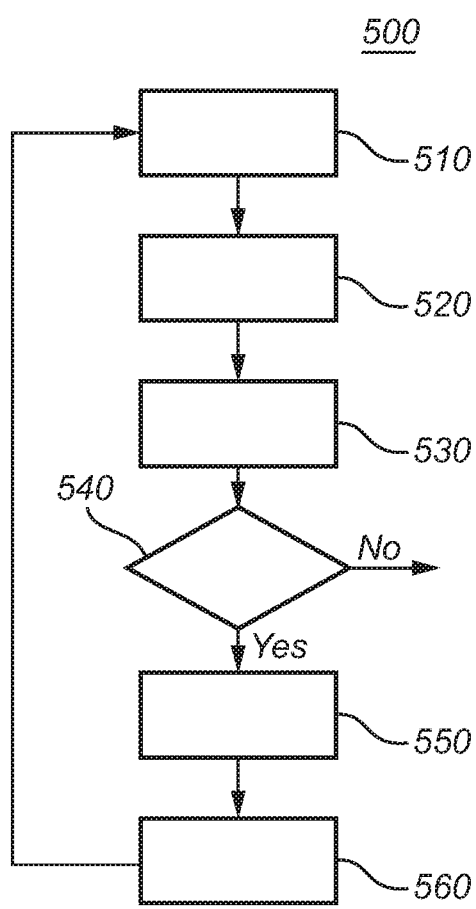
FIGS. 5-8 show overviews of one or more embodiments of a method implemented in a processing unit.

FIG. 5 is an overview of a method 500 implemented in a processing unit 160 controlling a surveying instrument 100.

The method 500 includes a step of obtaining 510 a first set of data. The first set of data may be obtained from the surveying instrument 100. From the data, a representation of movements over time may be determined 520. The movements over time may be represented by a specific parameter, as suitable (and as described above).

The method may further comprise a step of receiving 530 a second set of data. The second set of data may also include information about the specific parameter obtained from the first set of data. The second set of data may be received from a sensor unit over a communication channel.

It will be appreciated that the steps 510-520 and 530 may be performed in any order.

The method may further include determining 540 if the movement pattern of the first set of data is similar, equal to, or within a predetermined range from the second set of data.

If it has been determined that the movement patterns match, it may be determined 550 that the second set of data originates from a sensor unit attached to the target from which the first set of data 550 has been obtained by optical tracking. The tracking may then be continued 560.

Figure 6:
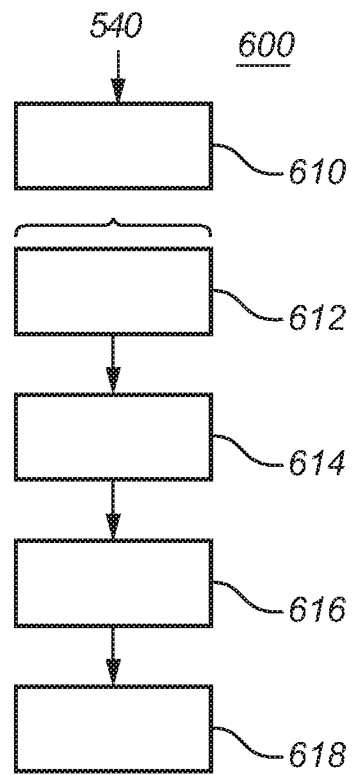

FIG. 6 illustrates more steps possible after it has been determined in step 540 that the movement patterns match or deviate by a predetermined interval.

For example, a rotation of the target in relation to the surveying instrument may be determined 610. The step 610 may comprise sub-steps as in 612-618. It may comprise a sub step 612 of determining, in a coordinate system, a first path of the optically tracked target based on the first set of data. The coordinate system, as mentioned above, may be any coordinate system for the parameter over time.

The step 610 may further comprise a sub step 614 of determining, which may be in the coordinate system as used in sub step 612, a second path based on the second set of data.

It will be appreciated that the sub steps 612 and 614 may be performed in any order.

The step 610 may further comprise a sub step 616 of comparing the two paths, as determined in sub steps 612 and 614, to determine an angle between the first path and the second path. The angle may be determined, as suitable, in the coordinate system used.

The step 610 may further comprise a sub step 618 of determining the rotation of the target in relation to the surveying instrument based on the comparison. The determining of the rotation may be based on the angle. In some coordinate systems the angle between the two paths directly correspond to the rotation of the target in relation of the surveying system.

It will be appreciated that the steps 560 and 550 may be performed in any order.

Figure 7:
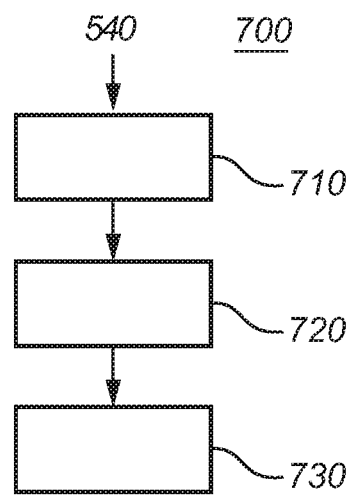
Figure 8:
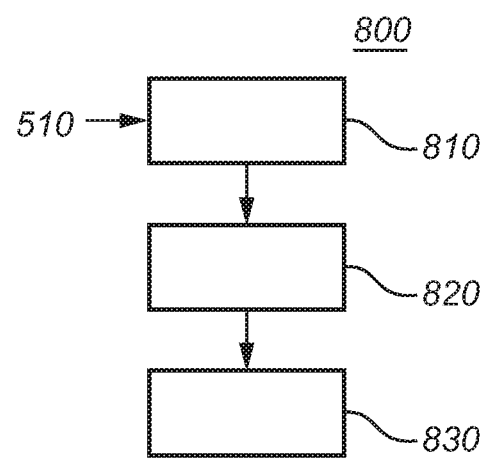

FIG. 7 is an illustration of steps possible after it has been determined in step 540 that the movement patterns do not match.

If it has been determined that the movement patterns do not match and/or are not within a predetermined interval from each other in step 540, it may be determined in step 710 that the second set of data does not originate from a sensor unit attached to the target of the first set of data. It may also be concluded that the optically tracked target is not the correct target to track. The optical tracking of the target may therefore be stopped, step 720. Instead, a search for the target to which the sensor unit is attached may be initiated, step 730.

The search may be optically done, or visually, depending on the capabilities of the surveying instrument. Once a new potential target has been found, the method 500 may be performed again.

The optical tracking 510 of a target may comprise the step 810 of transmitting a light signal towards a target at an emission time, the step 820 of receiving, at a receive time, a return light signal from reflection of the transmit light signal against the target, and the step 830 determining a direction and/or a position of the target based on at least the emission time and receive time. Different light sources and/or different receivers may be used for determining the direction and the position of the target. For example, a first light source and a first receiver may be used for determining the direction of a target, and a second light source and a second receiver may be used for determining the distance to the target or a position of the target.

A processing unit may be configured to contain instructions that, when executed, causes the processing unit to, by itself and/or by directing other components that are also included, perform one or more steps or methods according to any embodiments described herein. If a method involves the operation of several devices, such as a surveying instrument, a sensor unit and a target, a processing unit for a surveying instrument may be responsible for performing the parts of a method which involves the device which the processing unit is configured to control (and possible in which it is located).

The steps of any method disclosed herein do not necessarily have to be performed in the exact order disclosed, unless explicitly stated to the contrary.

The person skilled in the art realizes that the present disclosure is by no means limited to the embodiments described above. On the contrary, many modifications and variations are possible within the scope of the appended claims.

Although features and elements are described above in particular combinations, each feature or element may be used alone without the other features and elements or in various combinations with or without other features and elements.

Further, although applications of the surveying instrument and target have been described with reference to a surveying system, the present disclosure may be applicable to any systems or instruments in which a target or object has to be detected in the vicinity of such a surveying instrument.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. Method implemented in a processing unit controlling a surveying instrument, the method comprising:
   obtaining a first set of data from optical tracking of a first target with the surveying instrument;

identifying from the first set of data a first dependence over time of at least one parameter representative of movements of said first target;

identifying a first movement pattern of the first target using the dependence over time of the at least one parameter;

receiving a second set of data from a sensor unit coupled to a second target, the second set of data received from the sensor unit via a communication channel;

identifying from the second set of data a second dependence over time of said at least one parameter representative of movements of said second target;

identifying a second movement pattern of the second target using the second dependence over time of the at least one parameter;

comparing the first movement pattern of the first target with the second movement pattern of the second target;

determining at the first target and the second target are the same target if the first movement pattern is the same as, or deviates by a predetermined interval from, the second movement pattern; and thereafter continuing optical tracking of said first target.

2. The method of claim 1, further comprising:

determining that the first target and the second target are different targets if the first movement pattern deviates by more than the predetermined interval from the second movement pattern; and thereafter stopping optical tracking of said first target.

3. The method of claim 2, further comprising:

initiating a search for the second target to which the sensor unit is attached.

4. The method of claim 1, wherein the method further comprises determining whether, at least based on a configured distance along a geodetic pole between an optical element coupled to the geodetic pole for optical tracking of the second target and the sensor unit attached to said second target, the first movement pattern obtained by the first set of data matches the second movement pattern obtained by the second set of data.

5. The method of claim 4, further comprising:

determining, if it has been determined that the movement patterns obtained by the first and second sets of data do not match based on the configured distance between the sensor unit attached to said second target and the optical element along the geodetic pole of the second target, whether the first movement pattern matches the second movement pattern using another distance between the sensor unit and the optical element of the second target along the geodetic pole.

6. The method of claim 1, further comprising:

if the first movement pattern is the same as, or deviates by a predetermined interval from, the second movement, determining an orientation of the first target in relation to the surveying instrument by:

determining in a coordinate system of the surveying instrument a first path of the first target based on the first set of data;

determining in the coordinate system a second path of the second target based on the second set of data;

comparing the two paths to determine an angle between the first path and the second path; and determining rotation of the first target in relation to the surveying instrument based on said comparison.

7. The method of claim 1, wherein the second set of data includes at least one of data from an accelerometer, data from a gyroscope, compass data, data from a barometric altimeter, or data from an image based motion sensor.

8. The method of claim 1, wherein the at least one parameter representative of movements over time of the first target includes acceleration, velocity, position, orientation, pressure or temperature.

9. The method of claim 1, wherein the receiving of the second set of data comprises establishing the communication channel between the processing unit and the sensor unit.

10. The method of claim 9, wherein the establishing includes using a pre-determined frequency.

11. The method of claim 1, wherein the second set of data comprises an identifier for establishing communication between the surveying instrument and the second target via the communication channel.

12. The method of claim 1, wherein the at least one parameter includes positions over time in a coordinate system.

13. The method of claim 1, wherein said optical tracking comprises:

transmitting a transmit light signal toward the first target at an emission time;

receiving, at a receive time, a return light signal from reflection of the transmit light signal against the first target; and determining a direction and/or a position of the first target based on at least the emission time and the receive time.

14. A processing unit, wherein the processing unit is configured to operate in accordance with a method as defined in claim 1.

15. A surveying instrument comprising a processing unit as defined in claim 14.

16. The surveying instrument of claim 15, comprising a transceiver configured to communicate with the sensor unit.

17. The surveying instrument of claim 15, further comprising a center unit having an instrument optical axis, the center unit being mounted on an alidade for rotation about a first axis and on a base for rotation about a second axis.

18. Method implemented in a processing unit controlling a surveying instrument, the method comprising:

obtaining a first set of data from optical tracking of a first target with the surveying instrument;

identifying from the first set of data a first dependence over time of at least one parameter representative of movements of said first target;

receiving a second set of data from a sensor unit coupled to a second target, the second set of data received from the sensor unit via a communication channel, said second set of data including information about a second dependence of said at least one parameter over time representative of movements of said second target;

determining whether a first movement pattern for the first target as defined by the first dependence over time of said at least one parameter is the same as, or deviates by a predetermined interval from, a second movement pattern as defined by the second dependence over time of said at least one parameter obtained from the second set of data; and if the first movement pattern for the first target is the same as, or deviated by a predetermined interval from, the second movement pattern obtained from the second set of data, determining an orientation of the first target in relation to the surveying instrument by:

determining in a coordinate system of the surveying instrument a first path of the first target based on the first set of data;

determining in the coordinate system a second path based on the second set of data;

comparing the two paths to determine an angle between the first path and the second path; and determining the rotation of the first target in relation to the surveying instrument based on said comparison.

19. The method of claim 18, wherein the at least one parameter representative of movements over time includes acceleration, velocity, position, orientation, pressure or temperature.

\* \* \* \* \*